March 2, 1937.                J. A. ORRIS                 2,072,766
                             RUMBLE SEAT TOP
                           Filed Feb. 4, 1935              2 Sheets-Sheet 1

John A. Orris,
INVENTOR

BY Victor J. Evans & Co.
ATTORNEY

WITNESS:

March 2, 1937.  J. A. ORRIS  2,072,766
RUMBLE SEAT TOP
Filed Feb. 4, 1935  2 Sheets—Sheet 2
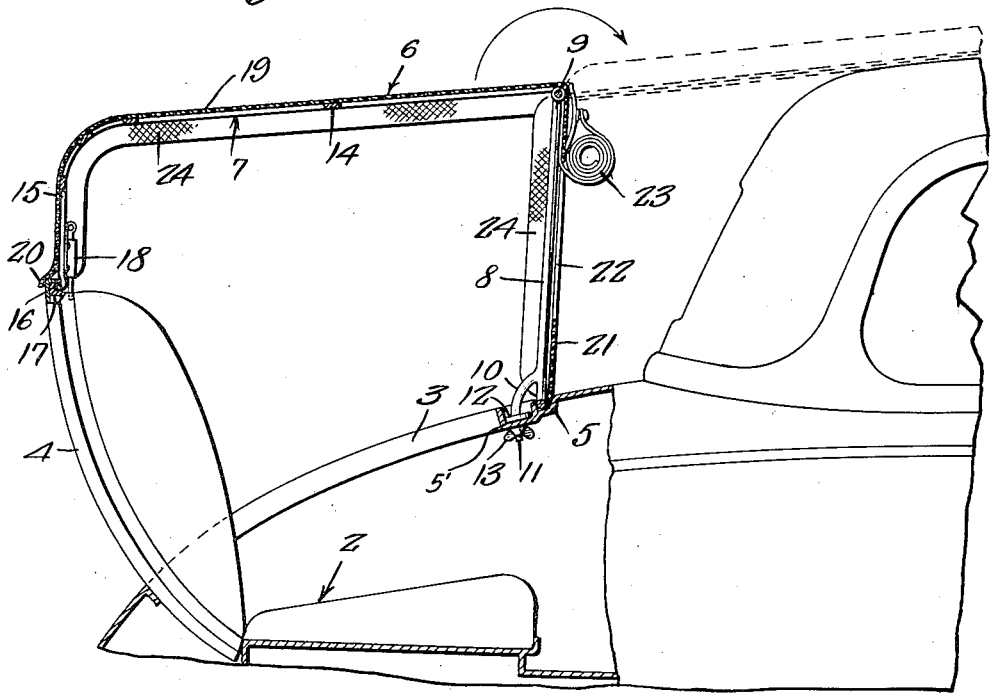
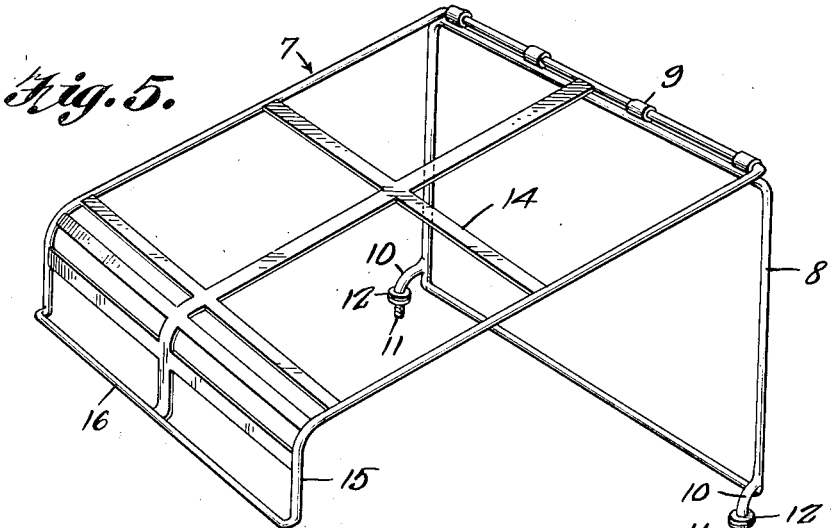
John A. Orris, INVENTOR
BY Victor J. Evans & Co.
ATTORNEY
WITNESS:

Patented Mar. 2, 1937

2,072,766

UNITED STATES PATENT OFFICE 2,072,766

RUMBLE SEAT TOP

John A. Orris, Windber, Pa.

Application February 4, 1935, Serial No. 4,948

2 Claims. (Cl. 296—99)

This invention relates to an automobile rumble seat top and has for the primary object the provision of a portable device of the stated character which may be easily and quickly applied to a tonneau of an automobile to provide protection to the occupants from weather elements and may be arranged to completely enclose the occupants when desired, still providing to the occupants clear vision.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a top adapted to an automobile and constructed in accordance with my invention.

Figure 2 is a rear elevation illustrating the same.

Figure 3 is a detail sectional view showing the means of mounting the top to the body of the automobile.

Figure 4 is a fragmentary vertical sectional view showing in dotted lines the positioning of the top to permit entrance to the rumble seat of the automobile.

Figure 5 is a perspective view illustrating the frame of the top.

Figure 1:
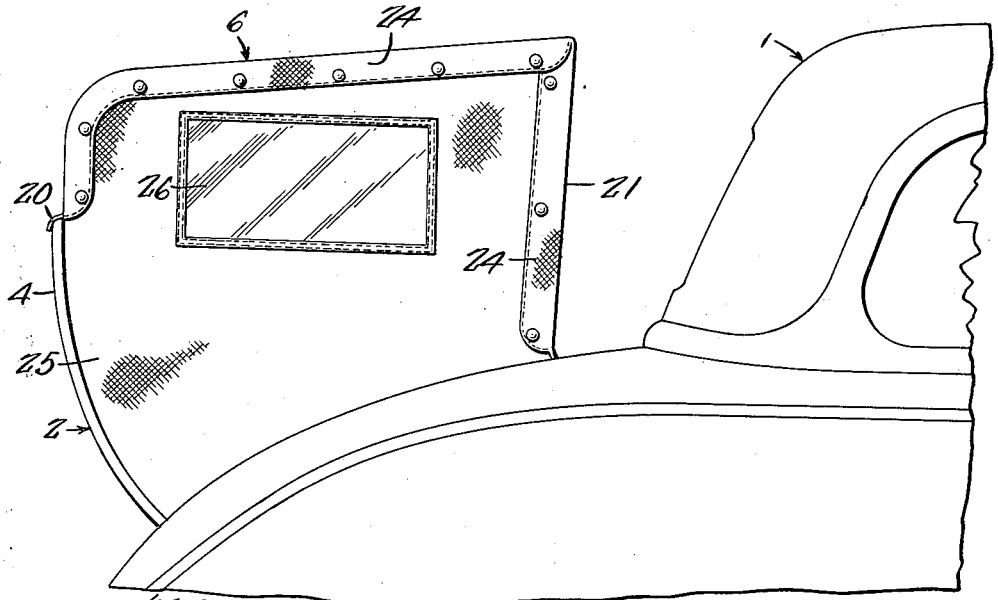
Figure 1:
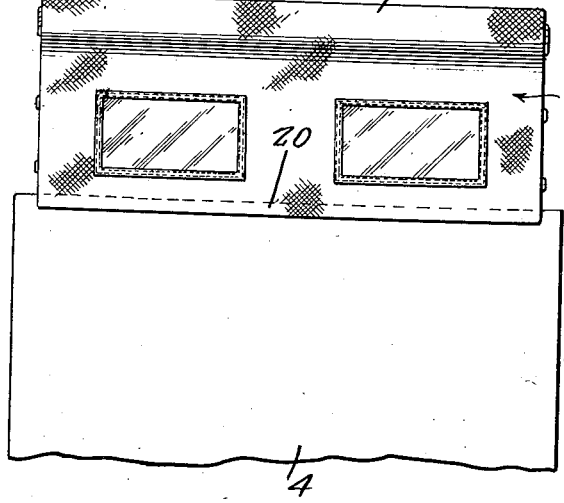
Figure 1:
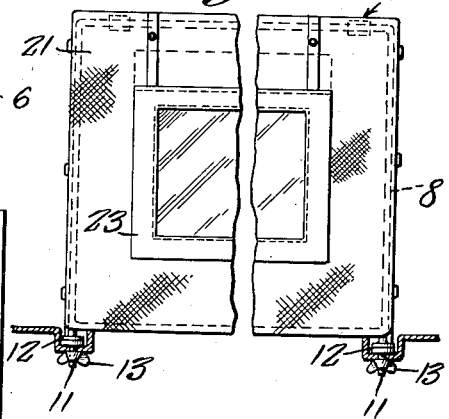

Referring in detail to the drawings, the numeral 1 indicates a fragmentary portion of an automobile body of the character having a rumble seat 2 mounted in the tonneau of the body, the tonneau being equipped with the usual opening 3 for permitting the back 4 of the seat to be positioned either for closing the opening 3 or disposed substantially vertically for supporting the backs of the occupants of the seat. The tonneau of the body about the opening 3 is provided with the usual rain groove 5. Also integrally formed with the inner wall afforded by the rain groove 5 there is a trough 5' whose lower wall is disposed below that provided by the groove 5. The trough 5' has sealed therein a sponge rubber gasket (not shown) which is designed to be contacted by a similar gasket sealed in a suitable groove or trough in the back 4 to afford bumper elements for the back when the same is swung to closed position and to also prevent rain water seeping from the rain groove into the tonneau of the body. This construction is well known in the art.

To provide protection to persons occupying the seat 2 against weather elements, a collapsible and removable top 6 is provided and consists of a top frame 7 and a front frame 8 hingedly connected, as shown at 9. The front frame 8 is of rectangular shape and when adapted to the automobile body is disposed vertically with its lower rung resting in the rain groove. Integral with the front frame 8 are rearwardly and downwardly extending arms 10 having screw threaded portions 11 which extend through openings in the trough 5'. The arms 10 are provided with compressible washers 12 to contact with the inner face of the lower wall of the trough 5'. Threaded on the arms are wing nuts 13 cooperating with the heads 12 in removably securing the front frame in position.

The top frame 7 is of substantially rectangular shape having a series of braces 14 and is curved to form a rear portion 15 to the top. The rear portion 15 or the lower rung 16 thereof is offset to fit in a groove for a packing strip 17 in the back 4. The walls afforded by the groove for the sponge rubber packing strip 17 are designed to be received in the trough 5', as is usual and whereby the packing strip 17 will contact with the gasket in the trough (when the back 4 is closed) to establish a water tight and practically an air tight joint between the back 4 and the opening 3 provided in the tonneau of the body, as is usual. The contacting engagement of the rung 16 with the sponge rubber packing strip 17 will, when the top is latched to the back 4, prevent accidental movement or rattling between the associated parts and the top 4 is of course formed with the usual lip to be received in the rain groove 5. A suitable latch 18 is carried by the portion 15 and is adapted to engage the usual keeper on the back 4 whereby the top frame 7 is releasably secured to the back 4 and may be swung over the top of the vehicle into a dotted line position, as shown in Figure 4, to permit persons to readily enter or exit from the seat 2.

A top covering 19 is suitably secured to the top frame 7 and its rear edge is left free to form a flap 20 adapted to overlie the upper edge of the back 4 of the seat 2, as shown in Figure 2. Joined with the forward edge of the covering 19 is a front covering 21 depending downwardly in advance of the front frame 8 and held in the drain groove of the body of the automobile by the lower rung of the front frame. The front covering 21 has a comparatively large opening 22 through which the occupants of the seat 2 may have vision. A curtain 23 is secured to the front covering and may be arranged to close the opening 22 or assembled in roll form, as shown in Figure 4. The curtain 23 may have a window therein so that the occupants of the seat 2 may have vision when the curtain is positioned to close the opening 22.

The coverings 19 and 21 extend beyond the side edges of the frame to provide flaps 24 to which are secured removable side curtains 25 having windows 26. The lower edges of the curtains are received in the trough and drain grooves of the automobile body and may be suitably secured therein.

A device of the character described may be easily and quickly applied to an automobile body and removed therefrom when desired and carried within the tonneau of the automobile body. To give unobstructed entrance to the seat 2 of the tonneau of the automobile body it is only necessary to release the finger operated spring influenced latch 18 from the keeper and swing the frame 7 forwardly to rest upon the roof of the automobile body, as shown in dotted lines in Figure 4.

The top covering 19 which overlies the portion 15 of the frame 7 may be provided with windows, as shown in Figure 2, so that the occupants of the seat 2 may have vision in a rearward direction.

Having described the invention, I claim:

1. A foldable top attachable to the vehicle structure of the rumble seat of an automobile when the swingable cover structure in which the seat is incorporated is in open or seating position and wherein the vehicle structure includes a rain groove for receiving a cooperating flange on the cover; said foldable top including a front frame section of substantially rectangular formation having rearwardly off-set downwardly extending arms having threaded ends adapted to extend through openings in the rain groove and be held by nuts for securing the frame section in an upright position with its lower portion in the rain groove, and a top frame section of substantially rectangular formation having its forward portion hingedly connected to the upper portion of said front frame section, said top frame section having a downwardly extending portion to the rear of the front frame section adapted to have its lower end in engagement with the flange of the seat back cover structure in its open position, and securing means carried by the top frame section engageable with the cover structure for holding the top frame section in said position but releasable to permit the same to be swung upwardly therefrom on its hinged connection with the front frame section.

2. A foldable top attachable to the vehicle structure of the rumble seat of an automobile when the swingable cover structure in which the seat is incorporated is in open or seating position and wherein the vehicle structure includes a rain groove for receiving a cooperating flange on the cover; said foldable top including a front frame section of substantially rectangular formation, means for securing said frame section in an upright position with its lower portion in the rain groove, and a top frame section of substantially rectangular formation having its forward portion hingedly connected to the upper portion of said front frame section, said top frame section having a downwardly extending portion to the rear of the front frame section adapted to have its lower end in engagement with the flange of the seat back cover structure in its open position, and a latch carried by the top frame section engageable with the cover structure for holding the top frame section in said position but releasable therefrom to permit the top frame to swing upwardly from the cover on its hinged connection with the front frame section.

JOHN A. ORRIS.